(No Model.)
W. P. TARBELL.
MIRROR SUPPORT AND ADJUSTING DEVICE.
No. 494,497. Patented Mar. 28, 1893.
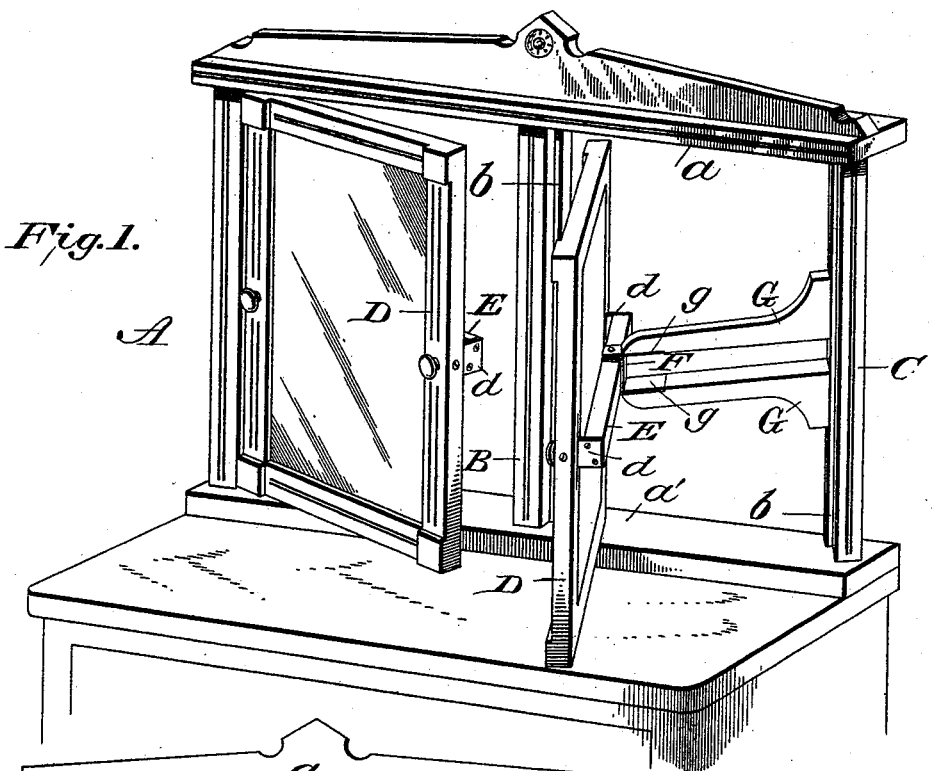
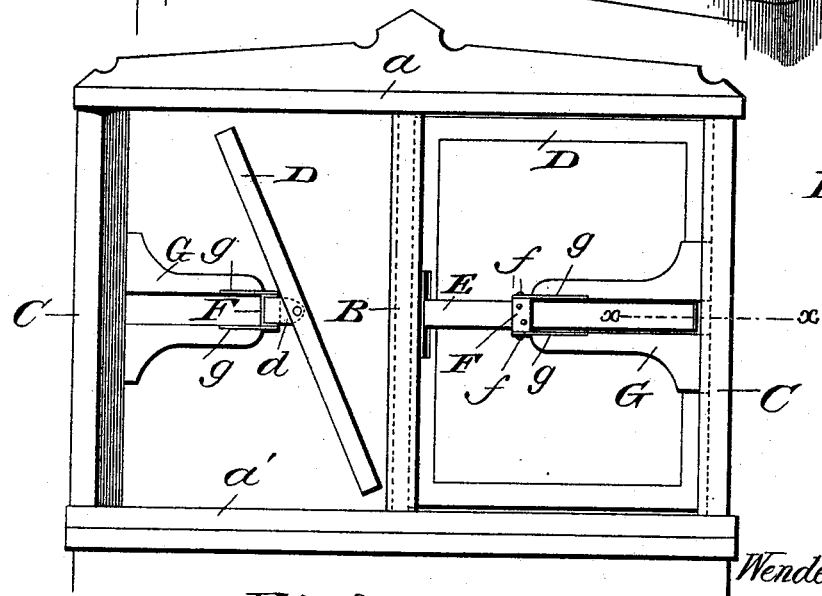
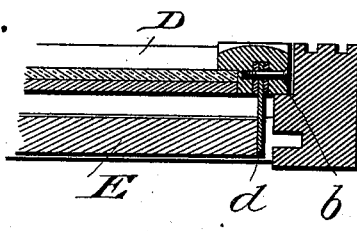
Witnesses
L. S. Elliott
C. W. Johnson
Wendell P. Tarbell.
Inventor
by [signature]
Attorney

UNITED STATES PATENT OFFICE.

WENDELL P. TARBELL, OF MILFORD, NEW HAMPSHIRE.

MIRROR-SUPPORT AND ADJUSTING DEVICE.

SPECIFICATION forming part of Letters Patent No. 494,497, dated March 28, 1893.

Application filed June 9, 1892. Serial No. 436,136. (No model.)

*To all whom it may concern:*

Be it known that I, WENDELL P. TARBELL, a citizen of the United States of America, residing at Milford, in the county of Hillsborough and State of New Hampshire, have invented certain new and useful Improvements in Mirror-Supports and Adjusting Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in supporting and adjusting devices for mirrors.

The object of the invention is to provide an improved mirror support which can be used as an independent piece of furniture or in connection with a dressing case, the mirrors being supported so that they can be turned at any suitable angle without interfering with the supporting frame; and the invention consists in the construction and combination of the parts, as will be hereinafter fully set forth and claimed.

In the accompanying drawings forming part of this specification: Figure 1 is a perspective view showing two mirrors attached to a supporting frame. Fig. 2 is a rear view. Fig. 3 is a sectional view through the line $x$—$x$ of Fig. 2.

A designates a supporting frame, preferably rectangular, the upper and lower pieces $a$ and $a'$ being connected to each other by a parting strip B, and by end uprights or supports C C. These uprights are pivoted between the horizontal pieces and are provided with projecting strips $b$ $b$, such strips being also attached to the parting strip B, and against these strips the mirror frames will bear when they are folded or placed on a line with the supporting frame.

The frames D D of the mirrors may be of any suitable construction and ornamentation, the vertical side pieces thereof being recessed to receive plates $d$ which are secured to supporting bars E and pivoted to the mirror frames so that said frames can have a rocking movement upon the supporting bars to change the vertical inclination thereof. The plates $d$ are preferably pivoted between two plates located within the recesses in the mirror frames, and the pivot bolt or screw which forms the pivot can be turned to clamp the plates and hold the mirror in an adjusted position. The supporting bar E is provided at one side of its center with a fixture or bearing plate F having upwardly and downwardly projecting pivot pins $f f$ with which plates $g$ $g$ attached to the ends of the arms G G engage, said arms being rigidly secured to the pivoted upright C. The arms G G, which are attached to the uprights C C consist of upper and lower portions between which a portion of the supporting bar E is adapted to lie, as shown in Fig. 2 of the drawings, when the mirror is folded on a line with the frame, said supporting bar being pivotally attached to the plates secured to the ends of said arms so as to project slightly beyond the same. A mirror support thus constructed is extremely simple, and may be used as a pier or floor glass, and it will be noted that the mirror can be swung horizontally, and upon its axis, and may be tilted. When two mirrors are used they can be adjusted to face each other at any desired angle of inclination and when moved toward the frame will automatically assume the proper position therein.

Having thus described my invention, what I claim as new, and desire to secure by Letters Patent, is—

1. The combination with the mirror frames D D, plates $d$ $d$ pivotally attached thereto and provided with cross-bars E E, bracket arms G pivotally attached to said cross-bars and rigidly secured to turning posts C C, and a central post B constituting a part of the mirror supporting frame, the post B being rigidly attached to the upper and lower horizontal pieces $a$ and $a'$ substantially as shown, and for the purpose set forth.

2. In a mirror support which is adapted to sustain two mirrors, the combination of the frame having vertical supports C C, pivoted to the frame so as to turn therein arms rigidly attached thereto, said arms consisting of upper and lower portions as shown, a cross-bar pivotally secured to the arms so as to swing between the upper and lower portions, the cross bars being pivotally attached to the mirror frames, for the purpose set forth.

3. In combination with a frame, which is adapted to support two mirrors the vertical supports C pivoted so as to turn in the frame, said supports having outwardly projecting arms G G rigidly connected thereto, said arms carrying plates which are pivotally attached to a bar E the ends of which are in pivotal engagement with the mirror frames, and means for adjusting the frictional bearing between the mirror frame and the plates which engage therewith.

4. In combination in a support for two mirrors of the upper and lower transverse pieces $a$ and $a'$, a central parting strip B, vertical uprights C C pivoted between said pieces and carrying arms or brackets G G the ends of which embrace a transverse rock bar, said rock bar being held in pivotal engagement with the mirror frame, the parting strip and uprights C C having strips $b\ b$ against which the sides of the mirror frame bear, substantially as shown, and for the purpose set forth.

5. As an improvement in mirror supporting and adjusting devices, the combination of a frame consisting of upper and lower horizontal pieces, a central parting strip having a ledge or strip on each side, uprights pivoted near the ends of the horizontal pieces and provided with vertical ledges, brackets rigidly attached to the uprights, said brackets engaging with rock bars E to one side of their centers, said rock bars supporting mirror frames which are capable of being tilted thereon, substantially as shown, whereby the mirrors can be swung horizontally so as to be adjusted to and from each other and tilted to change their vertical inclination, for the purpose set forth.

In testimony whereof I affix my signature in presence of two witnesses.

WENDELL P. TARBELL.

Witnesses:
S. A. TARBELL,
J. M. BARTLETT.